United States Patent [19]
Adams

[11] 3,917,209
[45] Nov. 4, 1975

[54] VEHICLE SEAT SUPPORT
[75] Inventor: Albert John Adams, Fetcham, England
[73] Assignee: A. W. Chapman Limited, Great Britain
[22] Filed: July 10, 1974
[21] Appl. No.: 487,373

[30] Foreign Application Priority Data
July 24, 1973 United Kingdom.............. 35228/73

[52] U.S. Cl.................................. 248/399; 248/421
[51] Int. Cl.²....................... B61L 5/00; E01B 7/00
[58] Field of Search.......... 248/399, 400, 421, 157, 248/419, 420; 74/567; 297/347

[56] References Cited
UNITED STATES PATENTS

| | | | |
|---|---|---|---|
| 887,442 | 5/1908 | Tatum................................. | 74/567 |
| 3,085,778 | 4/1963 | Korn.................................... | 248/399 |
| 3,285,562 | 11/1966 | Langer................................ | 248/399 |
| 3,339,906 | 9/1967 | Persson.............................. | 248/399 |
| 3,784,147 | 1/1974 | Harder................................ | 248/421 |

FOREIGN PATENTS OR APPLICATIONS

| | | | |
|---|---|---|---|
| 587,920 | 5/1947 | United Kingdom............... | 248/421 |
| 1,372,202 | 8/1964 | France................................ | 248/399 |
| 1,311,708 | 10/1962 | France................................ | 248/399 |

*Primary Examiner*—Roy D. Frazier
*Assistant Examiner*—Lawrence J. Staab
*Attorney, Agent, or Firm*—Irving M. Weiner

[57] ABSTRACT

A vehicle seat support which is damped to provide a cushioned ride and which include spaced seat pan and base plate assemblies connected to one another by parallel link mechanism. The support is provided with means adjustable to compensate for the weight of seat users in accordance with a scale.

The seat support is additionally provided with a lock which converts the suspension unit into a fixed seat.

8 Claims, 9 Drawing Figures

VEHICLE SEAT SUPPORT

This invention relates to a vehicle seat support.

The present invention consists in a vehicle seat support which includes a seat pan assembly intended to support a vehicle seat, a base plate assembly intended to be mounted on the floor of a vehicle, parallel link mechanism connecting the seat pan assembly and the base plate assembly to one another, a first spring abutment on the base plate assembly and a second spring abutment on one of the links of said parallel link mechanism, a compression spring acting between said abutments, and the adjustment of the distance between the first and the second spring abutments being effected by adjusting means acting between said base plate assembly and said one of said links.

In a preferred embodiment, said adjusting means is a prism which is mounted on said base plate assembly for angular movements about an axis which extends eccentrically through the prism parallel to each of its substantially parallelogram-shaped faces, and said one of said links having a projection, whereby said prism is angularly movable about said axis to position one of the faces thereof to serve as a stop surface to be contacted by said projection when the seat support is unloaded. Said projection and said prism may be located at substantially the middle of the width dimension of the seat support and will preferably be provided with an adjustment lever.

In an alternative embodiment, in addition to the feature or features described in the preceding paragraph, said vehicle seat support includes means operable to override the compression spring and thus to convert the suspended seat support into a fixed seat support. This additional feature facilitates getting into and getting out of the suspended seat.

A hydraulic damper is preferably connected between the seat pan assembly and the base plate assembly.

Moreover, the seat pan assembly is preferably constructed for the mounting thereon of slide and rail assemblies which are parallel to one another, the rails of said assemblies being secured to said seat pan assembly and the slides of said assemblies being intended for securement to a vehicle seat, whereby fore and aft movements of said seat relative to the seat pan assembly are obtainable. The coacting portions of the slide and the rail of each of said parallel slide and rail assemblies may be spaced from one another by one or more elements made from a material having a low coefficient of friction (for example from a synthetic resin material impregnated with molybdenum disulphide). One of said slide and rail assemblies will have catch means operable to provide a releasable connection between the slide and the rail thereof. One form of said catch means consists of an apertured plate secured to the seat pan assembly or to the rail and of a bracket carrying a spring-biassed angularly movable catch lever one end of which is shaped to form a detent which is urged (by the spring-biassing said catch lever) to extend into and through one of the apertures in said plate.

The present invention will now be more particularly described with reference to the accompanying drawings, in which.

Figure 1:
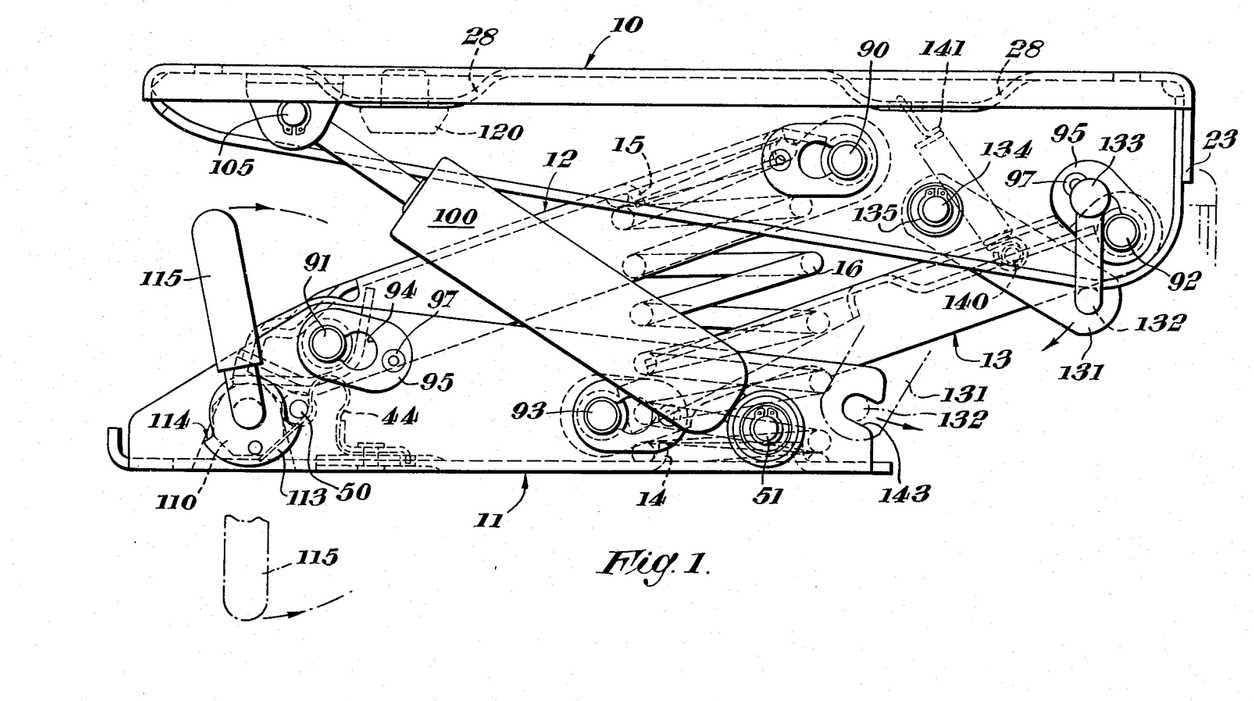
FIGS. 1 and 2 illustrate in side and rear elevations, respectively, a vehicle seat support which includes a seat pan assembly, a base plate assembly and a parallel link mechanism connected to one another.
Figure 2:
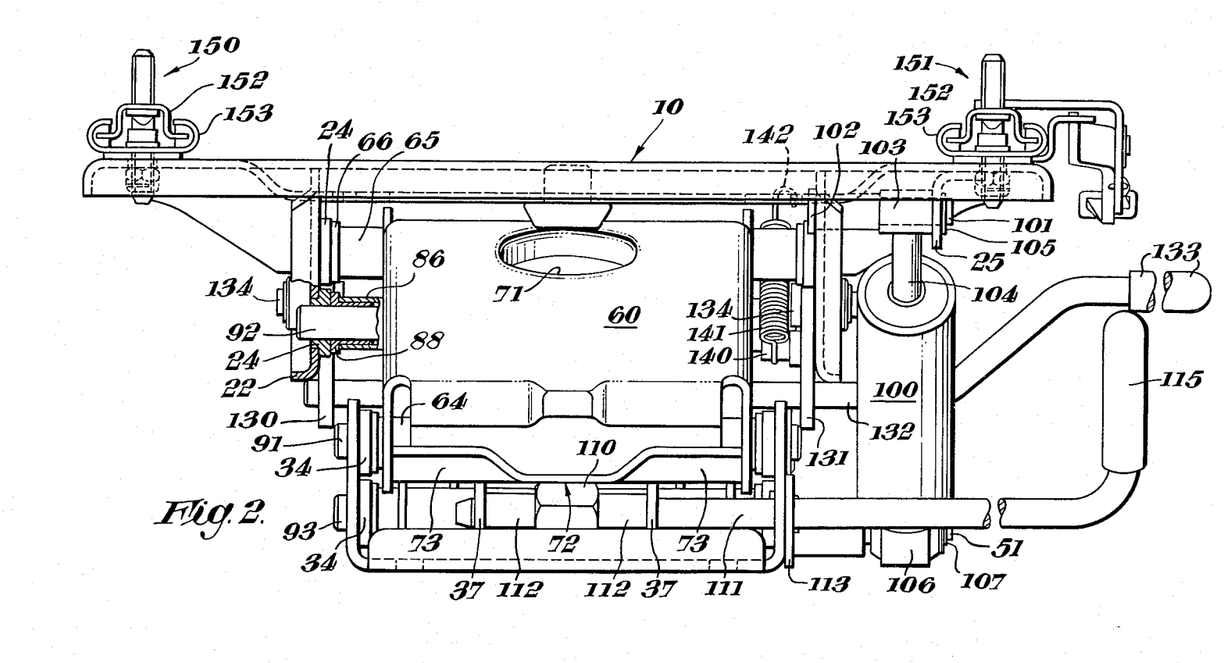

The vehicle seat support illustrated in FIGS. 1 and 2 comprises a seat pan assembly 10, a base plate assembly 11, parallel link mechanism connecting said seat pan assembly and said base plate assembly to one another and consisting of a support plate 12 and a connecting plate 13. The base plate 11 has a spring abutment 14 and the support plate 12 has a spring abutment 15, said spring abutments serving to locate the opposite ends of a compression spring 16 which therefore acts between the base plate 11 and the support plate 12.

Figure 3:
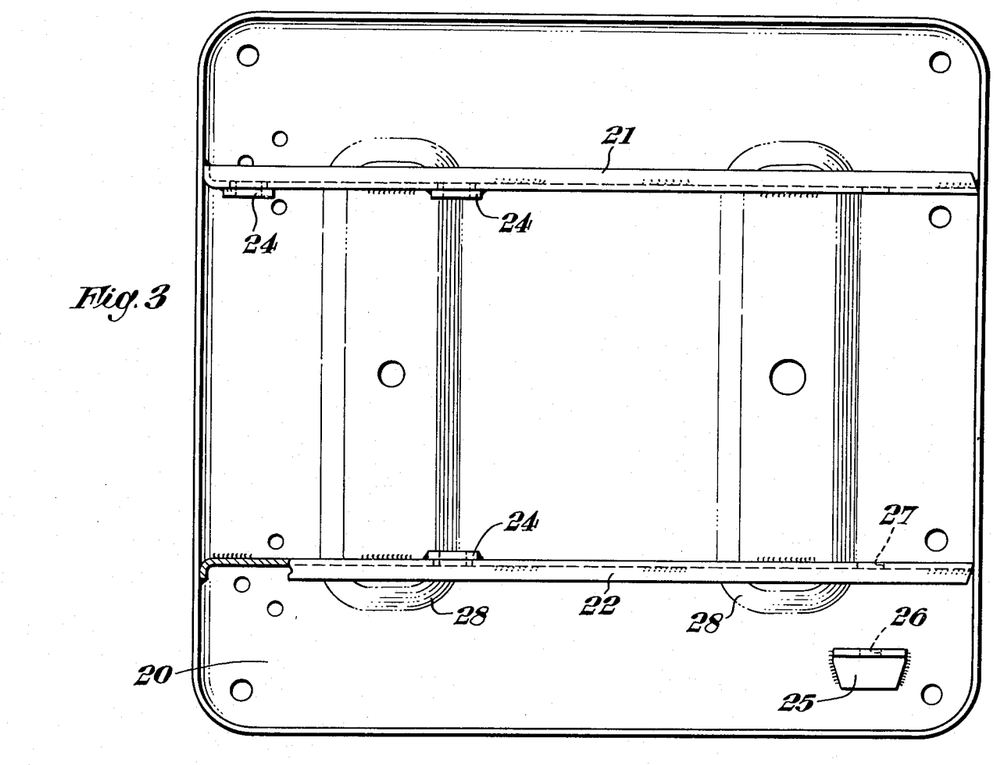
FIG. 3 is a plan view of the underside of said seat pan assembly by itself.

FIG. 3 illustrates the seat pan assembly 10 which consists of an essentially dished first part 20 into which strengthening ribs 28 have been pressed and to which parallel flanges 21, 22 have been welded. Said flanges extend from the front of said seat pan 10 to the back and are additionally welded at the front of the seat pan to an extension 23 of the first part 20, and the complete unit has great strength and rigidity. The vertical flanges 21, 22 are pierced and bushes 24 are placed therein and welded to provide bearings for the opposite end portions of two shafts which will be described. Only three of the four bushes 24 are shown because the front portion of the flange 22 has been cut away to show the dished section of each of the two flanges. Lastly, a bracket 25 is welded to the underside of the first part 20 and the free limb of the bracket is provided with a hole 26 which is in axial alignment with a hole 27 in the adjacent flange 22.

Figure 4:
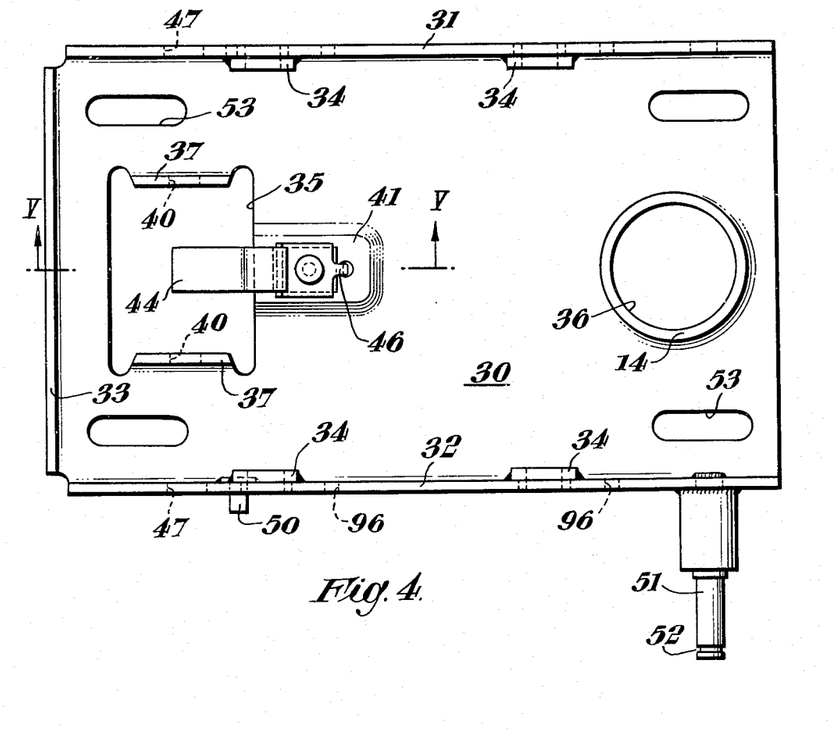
FIGS. 4 and 5 illustrate in top plan view and in side elevation, respectively, said base plate assembly, a portion of said side elevation showing a section on the line V—V in FIG. 4.
Figure 5:
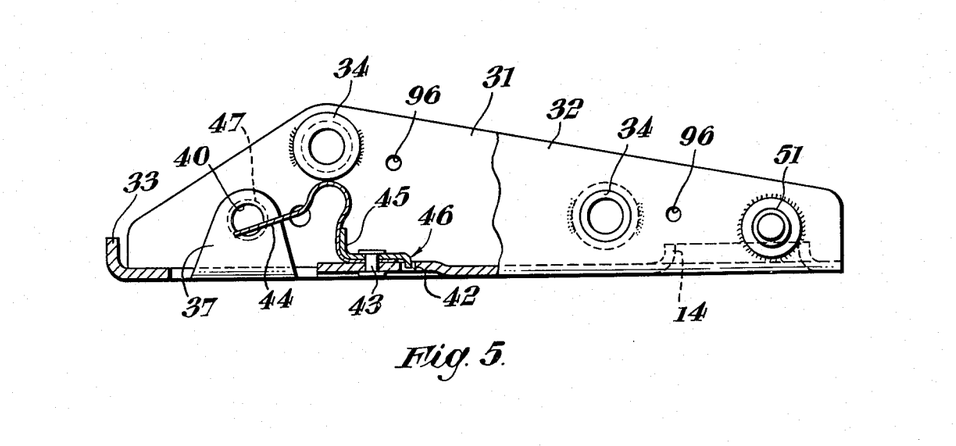

The base plate assembly 11 illustrated in FIGS. 4 and 5 is a pressing, having a bottom part 30, parallel side parts 31, 32 which are vertical to the plane of the bottom part 30 and a vertical part 33 at the rear of the part 30. The side parts 31, 32 are pierced and four bushes 34 are welded in position therein in the manner explained above with reference to FIG. 3. Two apertures 35, 36 are pierced in said part 30, two portions 37 being left in the operation of piercing the aperture 35 to provide a pair of spaced parallel vertical lugs each of which has a hole 40 formed therein, and the periphery defining the aperture 36 being upset to provide the spring abutment 14. An additional upset portion 41, apertured at 42, provides accommodation for the underside of a rivet 43 by which a spring 44 and a supporting angle plate 45 are very firmly secured to the base plate. A tail 46 on the front of the plate 45 is bent over and extends into the aperture 42 to prevent angular movement of the spring/plate assembly about the axis of the rivet.

The side parts 31, 32 have holes 47 formed therein in alignment with one another and with the holes 40. The side part 32 has a rivet 50 and also a shaft 51 welded thereto, the shaft 51 being welded at the front of said side part 32. The free end of said shaft has a circumferential groove 52 cut in it for a reason which will become apparent and the bottom part 30 also has appropriately spaced elongated holes 53 therein for the extension therethrough of fixing bolts or screws (not illustrated).

It will be appreciated that the side parts 31, 32 impart great strength longitudinally of the base plate and that the part 33 imparts great strength to said plate transversely.

Figures 6, 7:
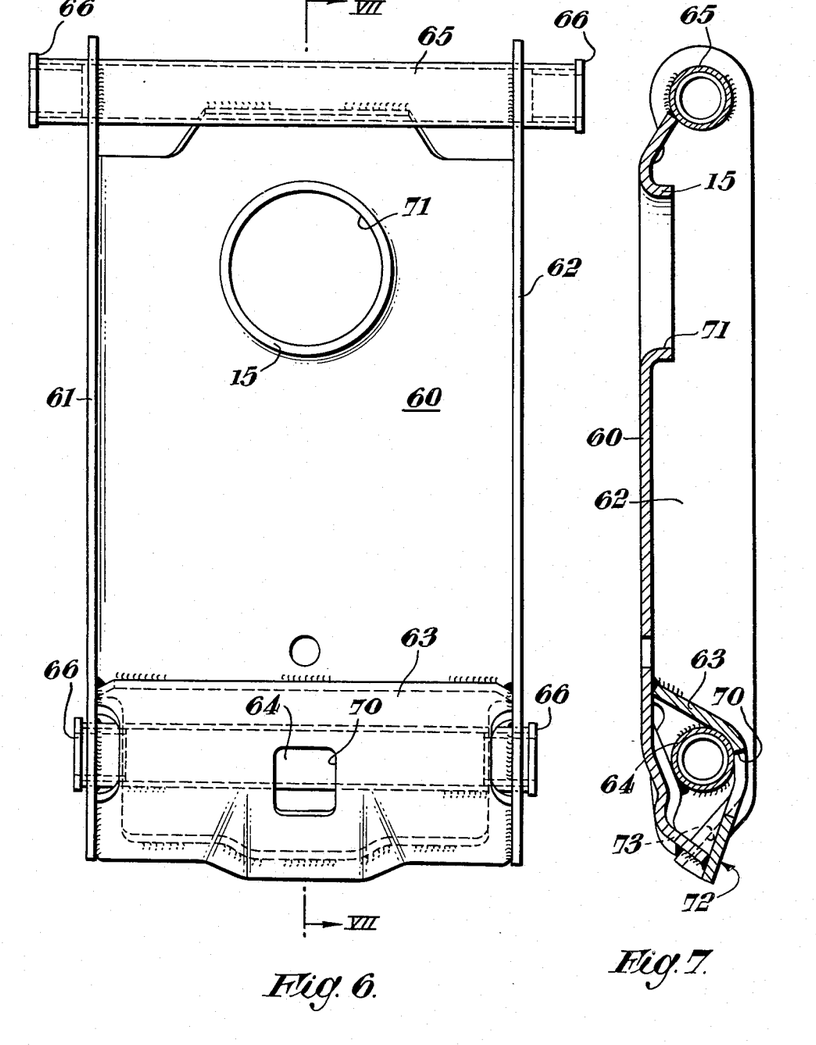
FIGS. 6 and 7 are a plan view of the underside of one element (namely, a support plate) of said parallel link mechanism and a section taken on the line VII—VII of FIG. 6, respectively.

The support plate 12 illustrated in FIGS. 6 and 7, consists essentially of a rectangular pressing having a bottom part 60 and integral vertical side parts 61, 62 a stop plate 63 welded to the bottom part and to said side parts in such a manner as substantially to enclose a tube 64, and a tube 65 which extends through holes which are pierced therefor in those ends of the side parts 61, 62 which are remote from the tube 64. Each of said tubes 64, 65 is appropriately welded to the bottom and side parts 60, 61, 62 to create a unitary structure in which the longitudinal axes of said tubes are parallel and the two ends of each of said tubes 64, 65 are also provided with bushes 66.

The stop plate 63 has a rectangular aperture 70 therein for the accommodation of one of the bends in the spring 44 (see FIG. 1) and also a circular aperture 71, the periphery which defines said aperture 71 being upset to provide the spring abutment 15. Furthermore, said stop plate 63 formed, over a region midway along its length, to provide a flat surface 72 whose plane does not contain the flat surfaces which lie on each side of said surface 72, one of said two flat surfaces being indicated by the reference numeral 73 in FIG. 7.

Figures 8, 9:
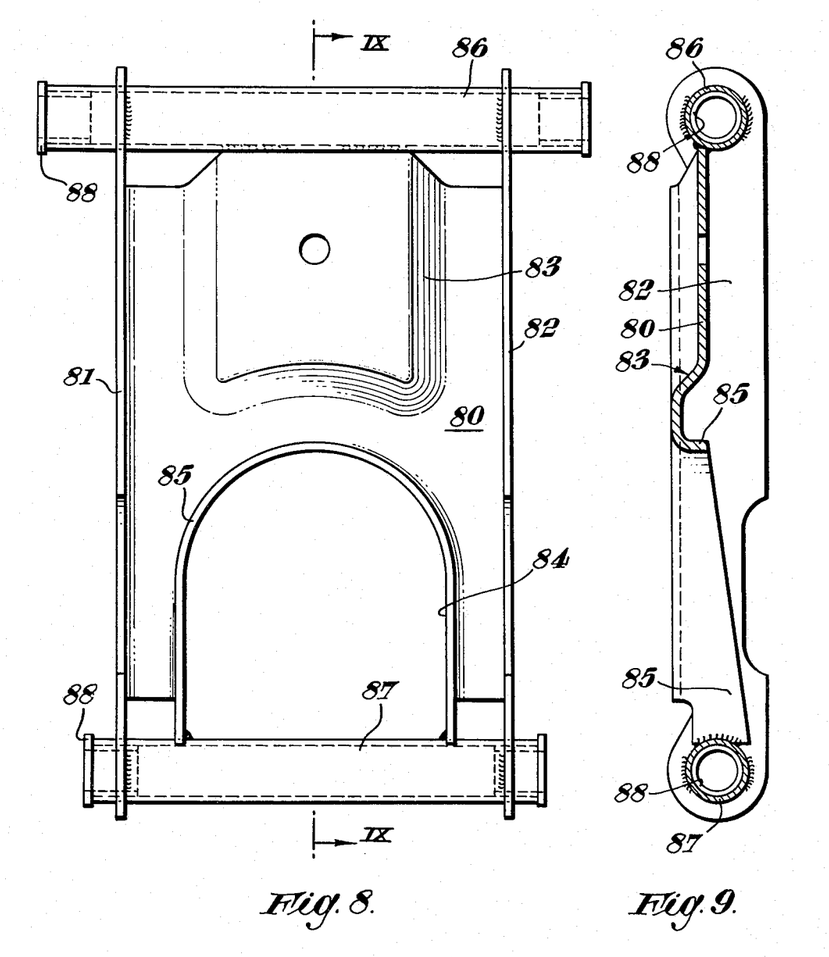
FIGS. 8 and 9 are a plan view of the underside of the other element (namely, a connecting plate) of said parallel link mechanism and a section taken on the line IX—IX in FIG. 8, respectively.

The connecting plate illustrated in FIGS. 8 and 9 is a pressing having a bottom part 80 and vertical side parts 81, 82. The part 80 is shaped at 83 to provide rigidity and is also apertured at 84, the periphery which defines the aperture 84 being upset to provide a flange 85 which is vertical to the general plane of the bottom part 80 and side flange 85 (being integral with the part 80).

The side parts 81, 82 are pierced at their respective ends to provide holes for the extension therethrough of two tubes 86, 87. The tube 86 is welded to the parts 81, 82 and to the bottom part 80 and the tube 87 is welded to the side parts 81, 82 and to the free ends of the flange 85. Bushes 88 are placed in the ends of the tubes 86, 87. As stated above with reference to FIGS. 6 and 7, said welding of the tubes 86, 87 to the bottom and side parts 80, 81, 82 creates a very strong unitary structure in which the longitudinal axes of the tubes 86, 87 are parallel to one another.

Referring again to FIGS. 1 and 2, it will be seen that a plurality of bearing shafts connects the respective ends of the support plate 12 and the connecting plate 13 to the seat pan 10 and the base plate 11. Thus, a bearing shaft 90 extends through the bushes 24 in the flanges 21, 22 and through the bushes 66 of the tube 65; a bearing shaft 91 extends through the bushes 34 in the side parts 31, 32 and through the bushes 66 of the tube 64; a bearing shaft 92 extends through the bushes 24 located near the front end of said flanges 21, 22 and through the bushes 88 of the tube 86; and a bearing shaft 93 extends through the bushes 34 located near the front end of said side parts 31, 32 and through the bushes 88 of the tube 87. Near the right-hand end (as seen in FIG. 2) of each shaft 90, 91, 92, 93 there is provided a circumferential slot and the outside diameter of each shaft at said slot is substantially equal to the dimension of the narrow or neck portion of a key-hole slot 94 which is formed in a plate 95. Said plate 95 in the case of each shaft, is inserted over the relevant end of the shaft until it is in register with the circumferential slot in said end and said plate 95 is then moved in a direction perpendicular to the axis of said shaft until another hole in said plate is in alignment with a hole 96, whereupon the plate 95 is connected to the relevant part of the assembly by a rivet 97. The holes 96 are shown in FIGS. 5 and 6 in each of said side parts 31, 32, this being done during manufacture to make provision for left-hand or right-hand versions of the vehicle seat support. Similar holes 96 are provided adjacent the bushes 24 (FIG. 3) as can be deduced from a comparison of FIG. 3 with FIG. 1. The plates 95 thus rivetted to the respective parts of the seat pan 10 and base plate 11 ensure that the various shafts 90, 91, 92, 93 are positively connected to said respective parts without any freedom to move in directions along their respective axes.

An hydraulic damper 100 having an eye formed at each end thereof is connected between the seat pan 10 and the base plate 11. Thus, a shaft 101 having a flanged end 102 extends through the aligned holes 26, 27 see FIG. 3) and through an eye 103 secured to the ram 104 of the damper, a circlip or other fastener 105 securing the shaft in position and against axial movements. A rubber bushed eye 106 secured to the other part of the damper 100 fits over the shaft 51 (FIGS. 4 and 5) and is retained by a circlip 107 which is snapped into the groove 52. The shaft 101 may be provided with a circumferential groove similar to the groove 52 and for the purpose of providing a seat for the circlip 105.

Located at the rear of the vehicle seat support is an adjusting means which acts between the base plate 11 and the support plate 12. Said adjusting means comprises a prism 110 which has eight substantially parallelogram-shaped faces (see FIG. 1) and which is secured to a shaft 111, said shaft extending eccentrically through said prism as can be seen clearly in FIG. 1. The shaft 111 is supported in a suitable manner for angular movements about its axis in the holes 40 in the lugs 37 and also in the hole 47 in the side portion 32, the prism 110 being located between said lugs 37 and being spaced from them by spacers 112.

Secured to the shaft 111, for example by welding, is a plate 113 whose periphery is divided into two portions each of which is circular. A first portion extending over approximately 135° is of a greater radius than the second portion which extends over approximately 225°, and the two portions are to one another by substantially radially extending flats 114 of which one is indicated in FIG. 1. The shaft 111 is cranked at the end thereof which is remote from the prism 110 to provide a suitably accessible operating handle 115 and the flats 114 of the plate 113 coact with the rivet 50 (FIGS. 1 and 4) to provide an operating arc of movement of the handle 115 which is limited to approximately 180°.

Secured to the seat pan 10 is a bump stop 120 which is provided to prevent damage to any part of the mechanism resulting from passage of the vehicle containing the seat support over a bump severe enough to cause the seat pan 10 to contact the upper surface of the support plate 12.

One end of a compression spring 16 engages the spring abutment 14 and the other end of said spring engages the spring abutment 15. It will be seen that said spring extends through the aperture 84 in the connecting plate 13.

In the condition of the mechanism which has been thus so far described above, it will be seen that the flat surface 72 is in contact with a face of the prism 110 and that the free end portion of the leaf spring 44 is in contact with another face of said prism. The shape of the spring 44 enables its said free end portion to locate positively on the available face of the prism. With the prism in the position illustrated in FIG. 1, the mechanism is adjusted to suit the person whose weight is small because (a) the distance between the rotational axis of the shaft 111 and the prism face which is vertically above said axis is the smallest obtainable with the eccentric mounting of said prism on said shaft, and (b) the surface 72 of the stop plate 63 which is in contact with said prism face is as near to said axis as it can be. This means that the support plate 12 has moved angularly in an anti-clockwise direction of of rotation about the axis of the shaft 91 until said surface 72 and, as a result, the compression spring 16 is under the least compression with the seat unoccupied. When the handle 115 has been moved from the position thereof which is drawn in full lines to the position thereof which is drawn in chain lines in FIG. 1, that is, as far as the rivet 50 will allow before being contacted by the relevant one of the two flats 114, the surface 72 will be in contact with that prism face which is the greatest distance from the rotational axis of the shaft 111; in this condition, the support plate will have been constrained to move angularly in a clockwise direction about the axis of the shaft 91 (as seen in FIG. 1) and this will have resulted in an increased degree of pre-compression being applied to the spring 16. This increased degree of pre-compression of said spring is the greatest available with the particular prism employed and is to suit the person whose weight is great.

Intermediate prism faces give intermediate degrees of pre-compression of said spring to suit the weights of persons whose weights are the minimum and maximum values. The weight range with which the suspended vehicle seat support is designed to deal with satisfactorily is from 63.5 kgs (140 lbs) to 113.4 kgs (250 lbs) but this range could be altered.

The suspended vehicle seat support described above works well but it is considered to be desirable to make it easier for a person to get into and out of the seat which is mounted on the slide and rail assemblies which are secured to the seat pan 10. It will be appreciated that the seat pan 10, and everything supported thereby, will tend to rise as soon as the seat occupant's weight starts to be removed from the seat and such condition can also arise during use of the vehicle in certain road or driving conditions and, consequently, it may be desirable to provide means operable to override the action of the compression spring 16 temporarily. One embodiment of such a means is illustrated in FIGS. 1 and 2 and comprises two levers 130, 131 each of which is fixedly secured near one end thereof to a transverse rod 132 which is extended at one side of the assembly to provide an operating handle 133, the other end of each lever 130, 131 being pivotally connected to the respective one of the flanges 21, 22 of the seat pan 10 by a shouldered pin 134 and a circlip 135. The lever 131 carries a pin 140 which serves as the anchorage for one end of a tension spring 141 whose other hooked end 142 is anchored to the seat pan 10 by being caused to extend through two holes formed for that purpose in the relevant one of the depressions which form the strengthening ribs 28. The tension spring 141 thus maintains the rod 132 in its inoperative position illustrated in FIG. 1 in full lines. The front edge of each of the side parts 31, 32 of the base plate 11 is provided with an open-ended notch 143 and, when the levers 130, 131 are moved angularly clockwise (as seen in FIG. 1) by operation of the handle 133, the rod 132 can be brought into the notches 143 in said side parts 31, 32. The seat occupant may need to bounce the seat in order to facilitate entry of said rod into said notches. With the rod in said notches (as drawn in chain lines in FIG. 1), the vehicle seat support is temporarily converted from a suspended or floating vehicle seat support to a fixed one and the setting thereof in that locked condition is equal to that achieved by adjustment of the prism 110 to its middle setting, namely, the No. 3 setting on said cam 110 for weights in the middle of the range of weights. The tension spring 141 will act to keep the rod 132 in said notches 143 because the line of action thereof will have moved to the other side of the axis of the relevant pin 134.

Upon removal of said rod 132 from said notches 143 by operation of the handle 133, said spring 141 will ensure that the locking means remains inoperative until it is required again.

In FIG. 2, a plain slide and rail assembly 150 and a catch slide and rail assembly 151 are shown as having been mounted on the seat pan 10, these having been omitted from FIG. 1 in the interests of clarity. The precise form of the slide and rail assemblies is not of any critical significance, nor is the precise form of the particular catch mechanism employed. As is well-know in the art, the seat is secured to the slides 152 and are movable relative to the rails 153 to provide for and aft adjustment of the seat in the vehicle. A catch mechanism is provided in order to permit locking of the slide to the rail, or vice versa, at one or both sides of the seat; in FIG. 2, such locking is only provided at one side.

I claim:

1. A vehicle seat support which includes a seat pan assembly intended to support a vehicle seat, a rigidly connected base plate assembly intended to be mounted on the floor of a vehicle, parallel links mechanism connecting the seat pan assembly and the base plate assembly to one another, a first spring abutment on the base plate assembly and a second spring abutment on one of the links of said parallel link mechanism, a compression spring acting between said abutments, and a rotatable adjusting means operable to effect the adjustment of the distance between the first and the second spring abutments, the axis of rotation of said adjusting means being fixed in relation to said base plate assembly and said adjusting means acting between said base plate assembly and said one of said links.

2. A vehicle seat support as claimed in claim 1, which further includes a projection on one of said links and wherein said adjusting means is a polygonal prism having a number of substantially parallelogram-shaped faces and which is mounted on said base plate assembly for angular movements about said axis of rotation, said axis of rotation extending eccentrically through the prism parallel to each of said faces, whereby angular movement of said prism about said axis of rotation positions one of said faces thereof to serve as a stop surface which is fixed in relation to said base plate assembly.

3. A vehicle seat support as claimed in claim 2, wherein said projection and said prism are located at substantially the middle of the width dimension of the seat support, an adjustment lever being connected to said prism to facilitate said angular movement thereof.

4. A vehicle seat support as claimed in claim 2, which further includes means operable to override the compression spring to convert the suspended vehicle seat support into a fixed vehicle seat support.

5. A vehicle seat support as claimed in claim 4, wherein said overriding means comprise a rod mounted on said seat pan assembly for angular movements relative thereto and rod-engaging means on said base plate assembly, angular movement of said rod in one direction enabling engagement of said rod by said rod-engaging means to fix the relative positions of said seat pan assembly and said base plate assembly, and angular movement of said rod in the opposite direction disengaging said rod from said rod-engaging means to enable the compression spring to be effective between said first and said second spring abutments.

6. A vehicle seat support as claimed in claim 1, which further includes a hydraulic damper connected between the front end of said seat pan assembly and the rear end of said base plate assembly.

7. A vehicle seat support which includes a rigidly connected base plate assembly intended to be secured to the floor of a vehicle, a first plate and a second plate each of which has two ends, corresponding one ends of said first and said second plates being pivotally connected to said base plate assembly, a seat pan assembly, the other corresponding ends of said first and said second plates being so pivotally connected to said seat pan assembly as to constitute a parallel links mechanism, a compression spring acting between said plate assembly and said first plate, a cam mounted upon said base plate assembly for angular movements about an axis of rotation which is fixed in relation to said base plate assembly, said cam being polygonal and having a number of flat faces, angular movement of said cam about said axis moving one of said flat faces into an operative position in place of another of said flat faces which previously occupied said operative position, a stop plate carried by said first plate, said stop plate being urged into contact with whichever flat face of said cam is in said operative position whenever said seat pan assembly is unloaded, and spring means acting on said cam to maintain said cam in whatever setting it has been set.

8. A vehicle seat support as claimed in claim 7, which further includes a rod mounted on and extending transversely of said seat pan assembly for angular movements relative thereto, means forming a part of said base plate assembly and engageable by said rod to fix the relative positions of said seat pan assembly and said base plate assembly, and a handle attached to said rod and operable to swing said rod from the position thereof in which said rod engages said means to fix said relative positions as aforesaid to the other position thereof in which said rod is out of engagement with said means, the compression spring being effective between said first and said second spring abutments when said rod occupies said other position thereof.

* * * * *